United Sta

Treuthart

[11] 3,811,748

[45] May 21, 1974

[54] OPTICAL SCANNER

[75] Inventor: Robert L. Treuthart, Villa Park, Calif.

[73] Assignee: Rockwell International Corporation, El Segundo, Calif.

[22] Filed: Oct. 2, 1972

[21] Appl. No.: 293,953

Related U.S. Application Data

[63] Continuation of Ser. No. 110,081, Jan. 27, 1971, abandoned.

[52] U.S. Cl................ 350/7, 350/285, 178/7.6
[51] Int. Cl. ............................................ G02b 17/00
[58] Field of Search .................. 350/6, 7, 285, 310; 178/7.6; 250/234, 235

[56] References Cited
UNITED STATES PATENTS

| | | | |
|---|---|---|---|
| 3,532,408 | 10/1970 | Dostal | 350/285 |
| 1,702,195 | 2/1929 | Centeno | 350/285 |
| 1,525,551 | 2/1925 | Jenkins | 350/285 |
| 3,423,522 | 1/1969 | Zwick | 350/6 |
| 1,438,974 | 12/1922 | Wente | 350/6 |
| 1,229,420 | 6/1917 | Dixon | 350/285 |

*Primary Examiner*—Ronald L. Wibert
*Assistant Examiner*—Michael J. Tokar
*Attorney, Agent, or Firm*—L. Lee Humphries; H. Fredrick Hamann; Rolf M. Pitts

[57] ABSTRACT

The optical scanner is designed with a system of torquing coils symmetrically distributed over the rear face of the scanning mirror about the mirror's pivot axis. Each torquer coil is disposed within air gaps of an array of permanent magnets so that current pulses in each of the coils produce a push-pull torque impulse on the mirror. The torquer structure is designed for optimal distribution of torquing impulse over the mirror surface to maximize the torquing effect and to minimize the effect of impulse shock which causes mirror bending and acoustic mode patterns in the mirror reflecting surface.

26 Claims, 24 Drawing Figures

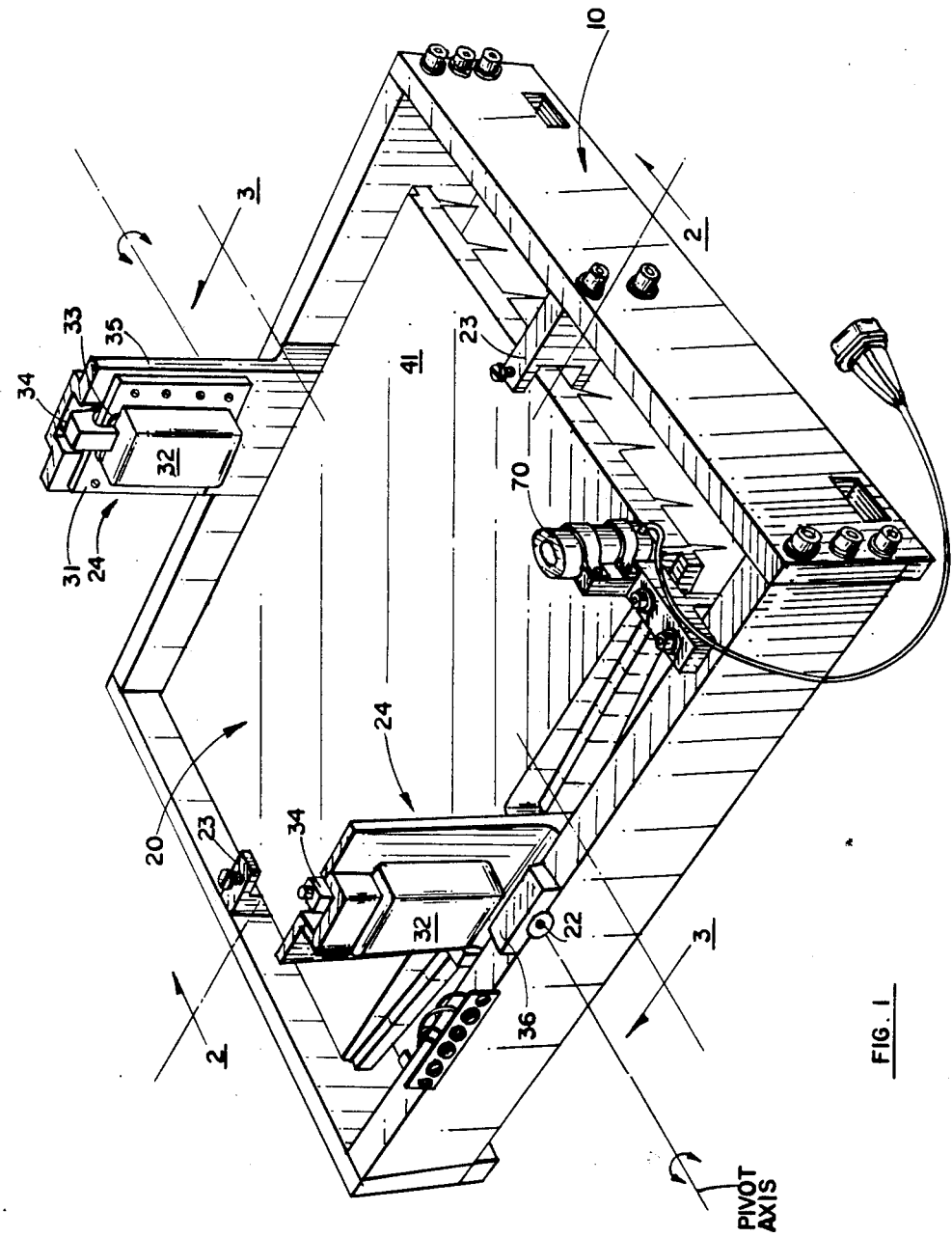

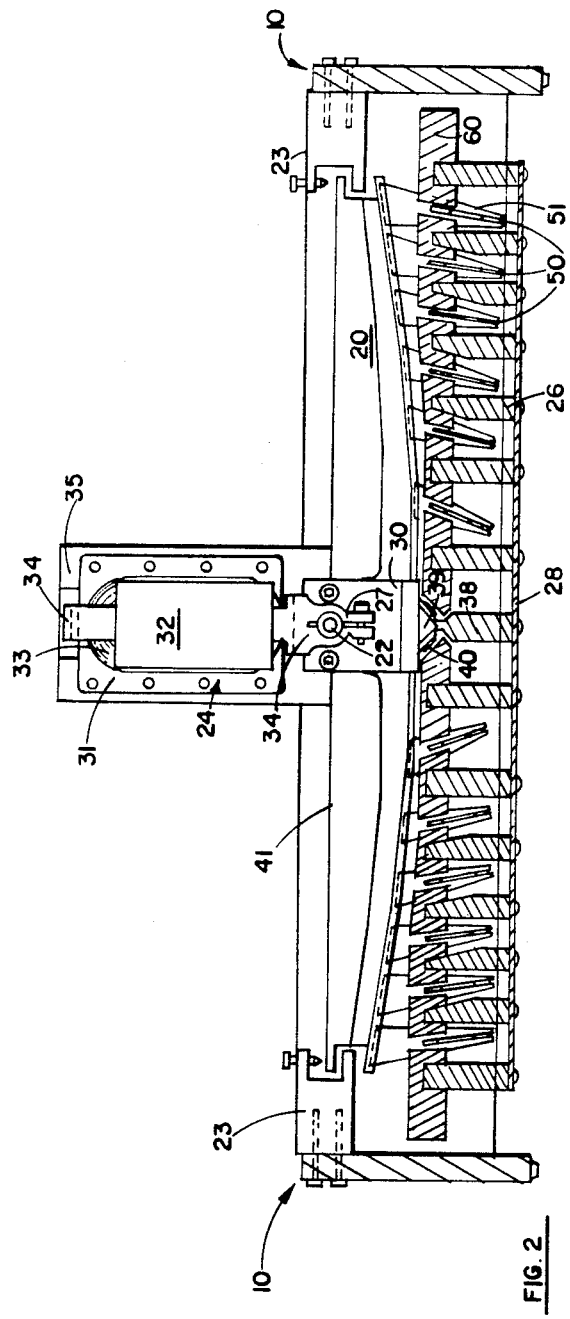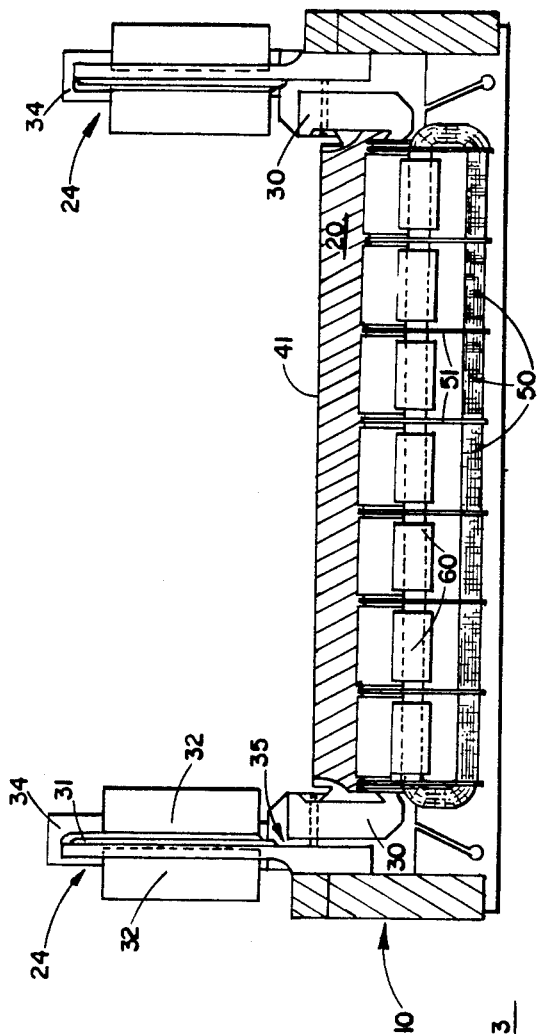

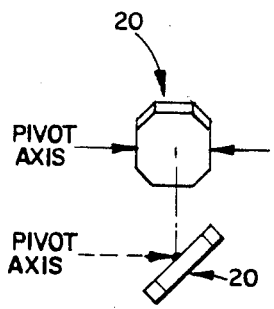
FIG. 8a
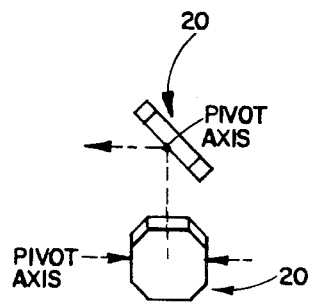
FIG. 8b
FIG. 8c
FIG. 8d
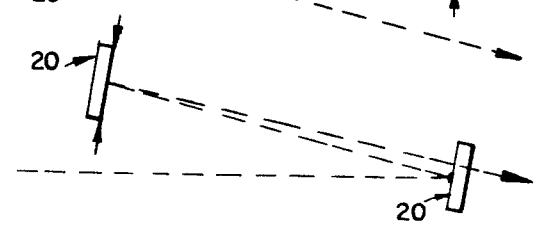
FIG. 8e
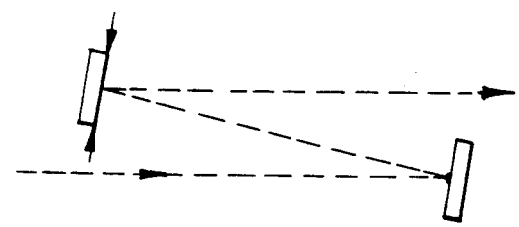

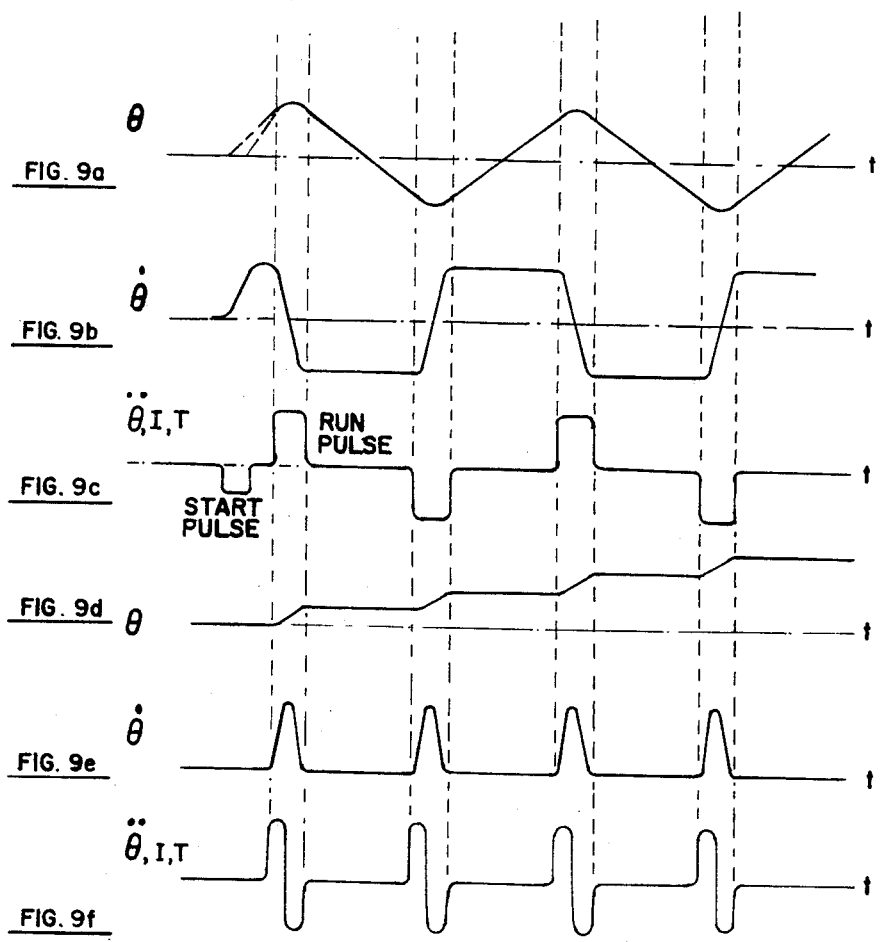
SCAN PARAMETERS

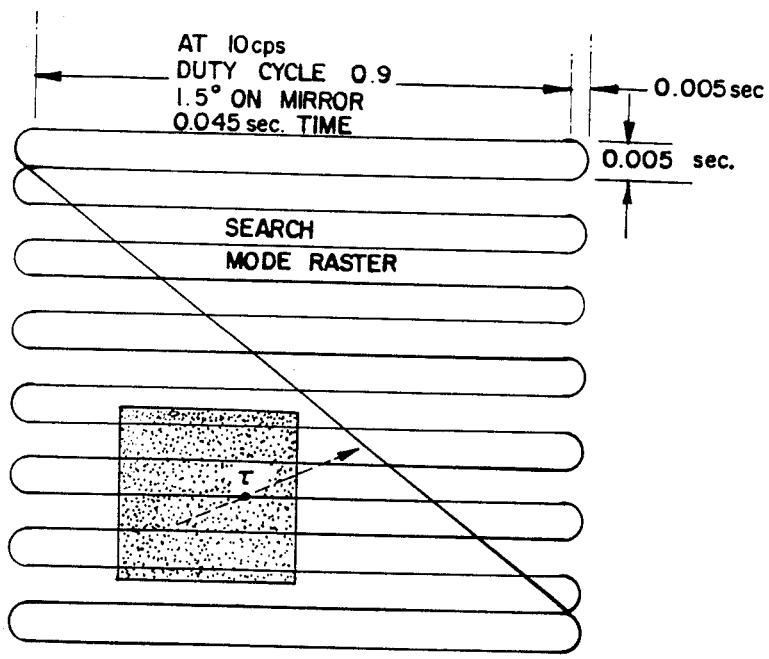
FIG. 10a
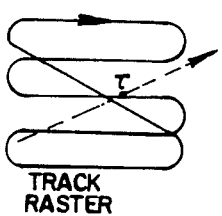
FIG. 10b TRACK RASTER
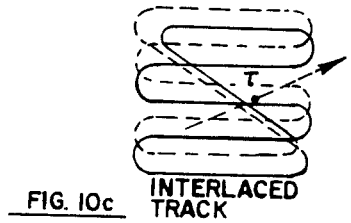
FIG. 10c INTERLACED TRACK
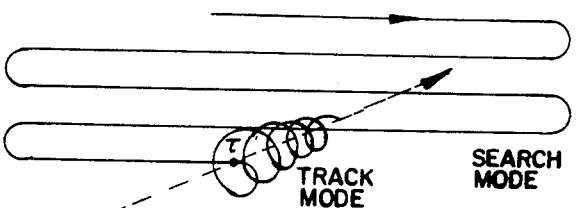
FIG. 10d

3,811,748

OPTICAL SCANNER

This is a continuation of application Ser. No. 110,081 filed Jan. 27, 1971, now abandoned.

BACKGROUND OF THE INVENTION

In the general field of laser radar, and more specifically, the field of satellite ranging and tracking, there is a need for a high resolution large aperture, two-axis scanner. Mechanical scanners are required for large apertures, and especially at 10 microns where electro-optic materials are rare in any aperture size. Typical scanners employ sinusoidally-driven mirrors which are of limited versatility. For the range of scan frequencies considered, there exist motor-driven mirrors that effect a change of scan angle, but the mechanics required to affect this change in scan are awkward. For designs requiring a specific frequency, mechanically resonant mirrors are appropriate, with change of amplitude (scan) being readily accomplished. A change of scan from a large field angle to a small field angle is particularly obnoxious with motor-driven mirrors, but is feasible with resonant mirrors. In addition to the sacrifice of scan frequency or scan amplitude, the sinusoidal type scan inherently prevents equal observation times per scan.

In approaching the problem of an equal observation time for large apertured scanners, if an electric or hydraulic servo drive is applied via a shaft of proportions which are small compared with the mirror aperture, mirror bending will occur unless a low duty cycle of scan is employed (long accelerating and decellerating times). If the drive is applied via a massive shaft which tapers outward toward the mirror, for example, to match the mirror dimension, a higher duty cycle can be used. The aforementioned approaches are still inferior to a distributed drive in terms of small mirror bending and a good scan duty cycle. The use of shaft coupled servo drives is therefore limited.

If the servo drive is distributed over the mirror substrate area so that, ideally, each element of mass is suitably driven and there is negligible bending, application of high magnitudes of torque can reduce the acceleration and deceleration intervals to maximize the useful duty cycle of scan. However, power demands for creating these torques present extreme demands on the servo electronics design. Therefore, these torques can instead be entered as ballistic impulses, with only low torque, low frequency responses being required of the servo system. The servo capability now becomes secondary and serves merely as an extension of the open loop ballistic operation. Thus, an acceptable solution is reached in the form of a servo augmented ballistic scanner having high frequency and amplitude response capabilities.

SUMMARY OF THE INVENTION

The present invention is directed to a mirror type scanner, and more particularly, to a mirror type scanner which can scan in a raster pattern and provide angular position readout and uniform time sharing for all angular scan elements within its field of view.

In the preferred embodiment of the invention there is provided a mirror scanner with a plurality of torquing coils symmetrically distributed over the rear face of the scanning mirror about the mirror's pivot axis. Each torquing coil is disposed within air gaps of an array of permanent magnets such that current pulses in each of the coils produce a push-pull torque on the mirror. The distribution of the torquer structure provides optimal distribution of the torquing impulses over the mirror to maximize torquing input and to minimize shock input that normally cause mirror bending and acoustic mode patterns over the reflecting surface.

In a second embodiment of the invention, two of the aforementioned scanner mirrors may be mounted with their pivot axis perpendicular to each other so as to generate a raster pattern by having one of the mirrors generating a step function between scan lines and providing the retrace at the end of each raster and the other mirror providing the line scans. Control of the torque impulses fed to the torquing coils can be used to accelerate, reverse, or stop the mirror motion at any desired position. During the time between reversals at each end of the scan line, the mirror may be operated in an undamped, ballistic motion. A pickoff may be used to provide a signal indicative of the angular orientation of the mirror about the pivot axis, which pickoff signal can then be compared against a desired angular position signal to servo the mirror to the desired angle. A counter weight means may be extended from the pivot axis of the mirror in an opposite direction from the plurality of torquing coils in order to dynamically and statically balance the mirror about the pivot axis. If the balanced counter weights are used, torquing means can be operably connected to the counter weight means so as to torque the counterweight by an amount proportional to the torque applied to the mirror so as to eliminate bending moments which otherwise would be introduced in the mirror and the pivot shaft supporting the mirror by requiring the counterweight to be torqued via the mirror.

Accordingly, it is an object of the present invention to provide an improved optical scanning device.

It is another object of the present invention to provide an optical scanning device which is linear over its entire scanning range.

It is an additional object of the present invention to provide an optical scanner which is capable of switching from the large search field to a small tracking pattern anywhere in the search field.

It is an additional object of the present invention to provide an optical scanner which will slave to a variety of scan profiles and which is stoppable within one resolution element.

The aforementioned and other objects of the present invention will become more apparent and better understood when taken in conjunction with the following description and drawings, throughout which like characters indicate like parts, and which drawings from a part of this application.

BRIEF DESCRIPTION OF THE DRAWINGS

FIG. 1 illustrates a perspective view of the preferred embodiment of the present invention.

FIG. 2 illustrates a sectioned view of the preferred embodiment taken along the section lines 2—2 of FIG. 1.

FIG. 3 is a sectioned view of the preferred embodiment taken along the section lines 3—3 of FIG. 1.

FIGS. 8a through 8e illustrate various search patterns that are possible with the preferred embodiment of FIG. 1.

FIGS. 9a through 9f illustrate waveforms useful in understanding the operation of the scanning mirror.

FIGS. 10a through 10d illustrate positioning of two of the scan mirrors to achieve various type raster scans.

DESCRIPTION OF THE PREFERRED EMBODIMENT

Figure 4:
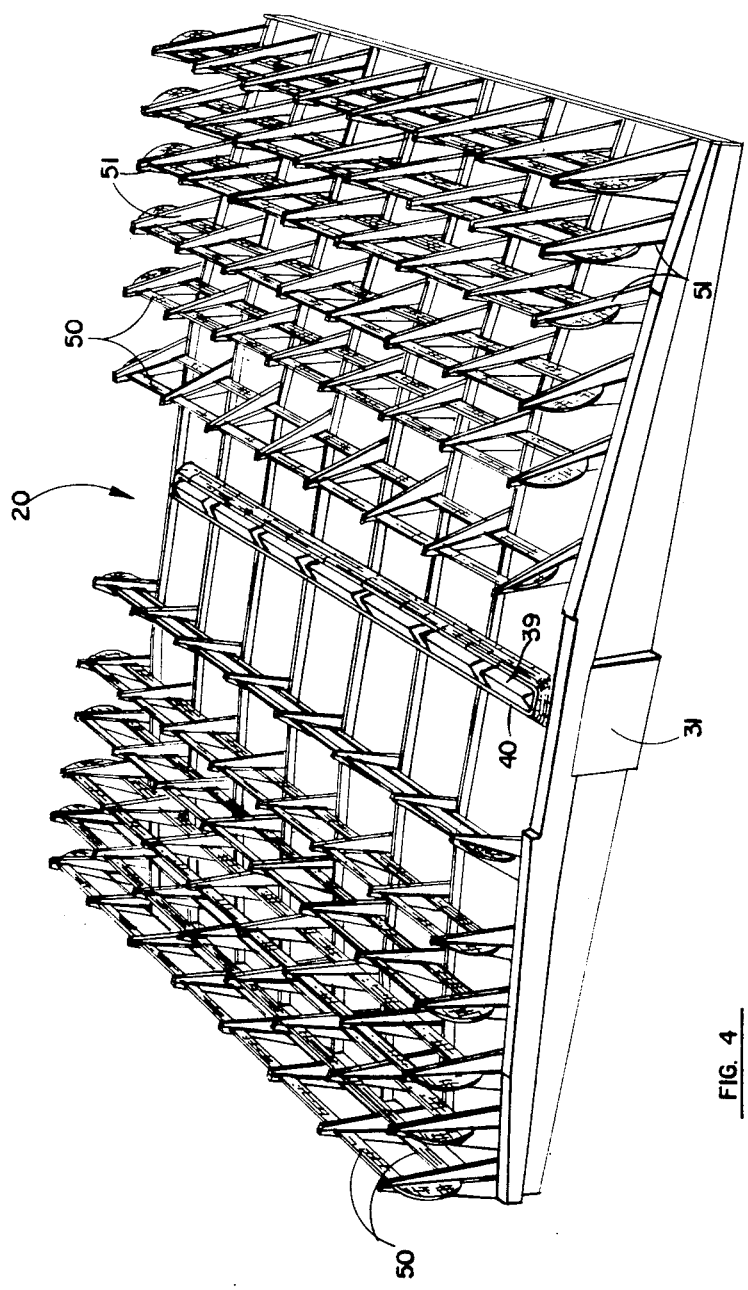
FIG. 4 is a perspective view of the rear surface of the mirror illustrating the positioning of the torquer coils.

Referring to FIG. 1, in conjunction with FIGS. 2 and 3, a scanning mirror element 20 is provided with a mirror surface 41. Projecting from the mirror element and coincident with the reflecting surface of the mirror are a pair of flexure shafts 22. The flexure shafts 22 are affixed to the mirror element by means of a clamp 27 integral with bracket 30 which is fixedly connected to the mirror element via clamping action of wedge 31. The axis of shafts 22 define the pivot axis of the mirror element which lies along the mirror surface. A frame member 10 is used to support the mirror element. The shafts 22 are mounted to the frame 10 by means of clamps 36. A pair of stops 23 are fixedly attached to the frame 10 and are adjusted to provide maximum limits of travel for the mirror 20. Counterweight assemblies 24 projects upward perpendicularly from the reflective surface 41 of the mirror assemblies 20. The purpose of the counterweight assembly is to dynamically and statically balance the mirror assembly 20 about the pivot axis. Each counterweight assembly 24 is comprised of opposing pairs of permanent magnets 32 which are fixedly attached to the mirror assembly 20 through a support member 34 which is an integral extension of the clamp 30. A counterweight pancake type torquer coil 33 is fixedly attached to a thin insulating board 31 on a yoke member 35 extending from the frame 10. The counterweight torquer coil 33 is positioned between the magnets 32 such that a current passing through the counterweight coil torques the counterweights to impart a direct torque to the counterweights. If the counterweight torquer coils are not used, the counterweights would have to be torqued by the distributed torquer (to be described) which is used to drive the mirror. This would be undesirable because it would induce bending moments and vibration in the mirror assembly.

A displacement type pickoff 70 is affixed to the frame 10 to provide an electrical output signal indicative of the angular position of the mirror element 20 about the pivot axis with respect to the housing 10. Attached to the rear surface of the mirror element 20 are a plurality of distributed coils 50 which are fixed to the mirror element 20 by support pylons 51. Disposed on each side of the coil members 50 are permanent magnets 60 which magnets are affixed to the frame 10 by means of non-magnetic mounting bars 26 and reinforcing cross-braces 28 to stiffen the bars 26 against vibration. The distributed torquing coils are symmetrically placed on the rear of the mirror assembly 20 with the axis of symmetry being the pivot axis. Each of the coil assemblies is mounted to the rear surface of the mirror at an angle which permits the planes of the coils to pass through centers of percussion of mirror mass elements into which the mirror may be considered to be divided in a manner normal to radii from the pivot axis to the centers.

Referring to FIG. 4 in conjunction with FIG. 2, the distributed coil assemblies 50 are shown placed on the rear surface of the mirror 20. The symmetrical arrangement of the six larger torquing coils and the two smaller torquing coils on either side of the pivot axis is clearly shown in this figure. A pair of torquer coils 40, of decreased height, are mounted to the rear of the mirror so as to encompass the sides of soft iron pole pieces 39, which pole pieces are shaped in the form of a triangle. The pole pieces 39 are held in position by a magnet mounting bar 38 which is attached to frame 10. The poles 39 provide continuity of magnetic flux between all permanent magnets 60 to either side of the pivot axis.

Figure 5:
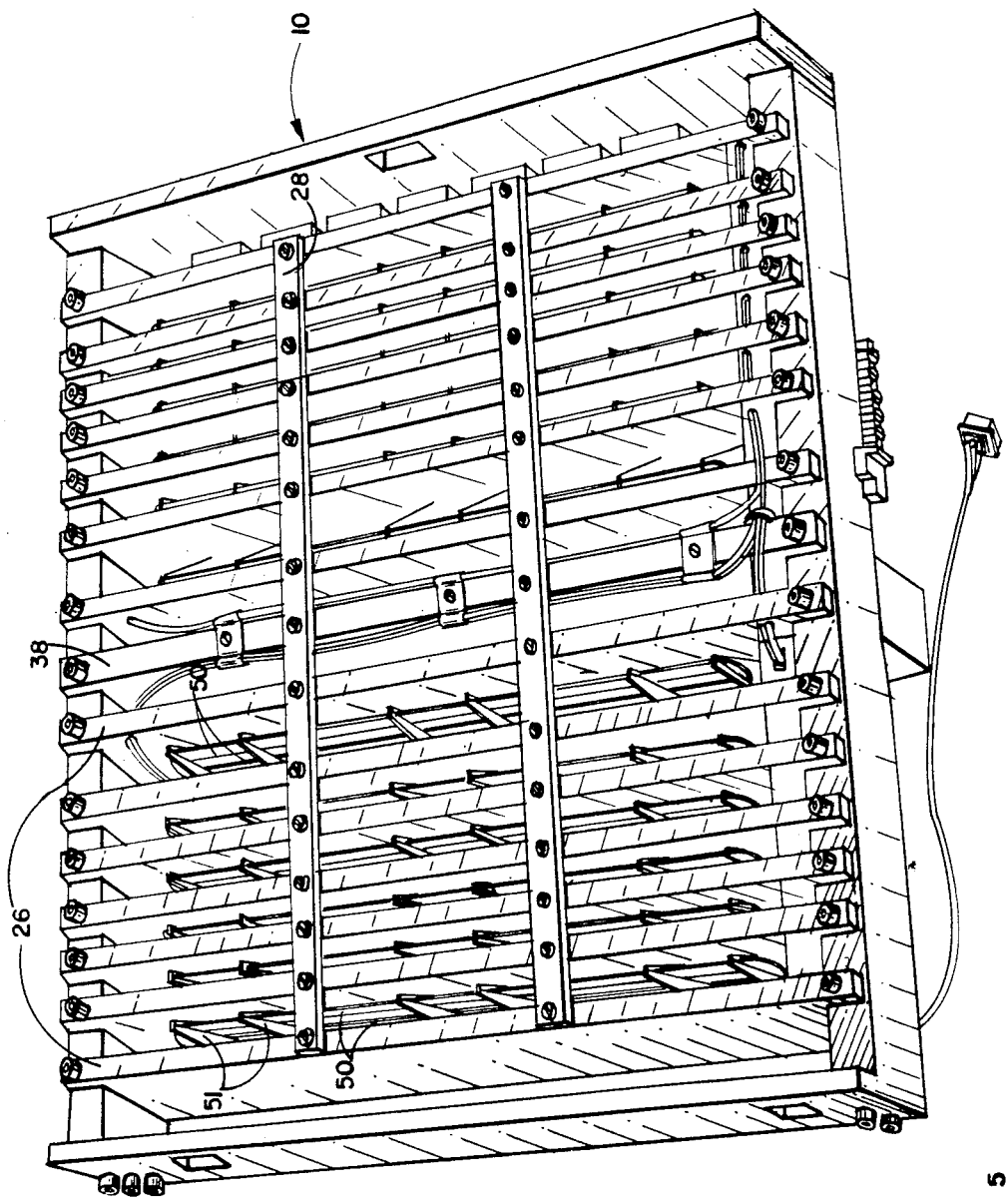
FIG. 5 is a perspective view of the underside of the preferred embodiment of FIG. 1 illustrating the positioning of the magnets and torquing coils at the rear of the mirror.

FIG. 5 is an underside view of the embodiment of FIG. 1 showing the relative position of the reinforcing cross-braces 28 with respect to the bars 26 and 28, the frame 10 and the coil members 50 and 40. The coil support members are disposed in 12 rows which are parallel to the pivot axis of the mirror. Each row has eight sheet magnesium support pylons 51 for supporting the 12 coils 50. The coils are positioned in slots in the support pylons 51 so as to lie in planes parallel with the mirror pivot axis. The gaps formed in the faces of magnets 60 are sloped to permit planes of the coils to pass through centers of percussion of mirror mass elements normal to radii from the pivot axis to the centers.

Figure 6:
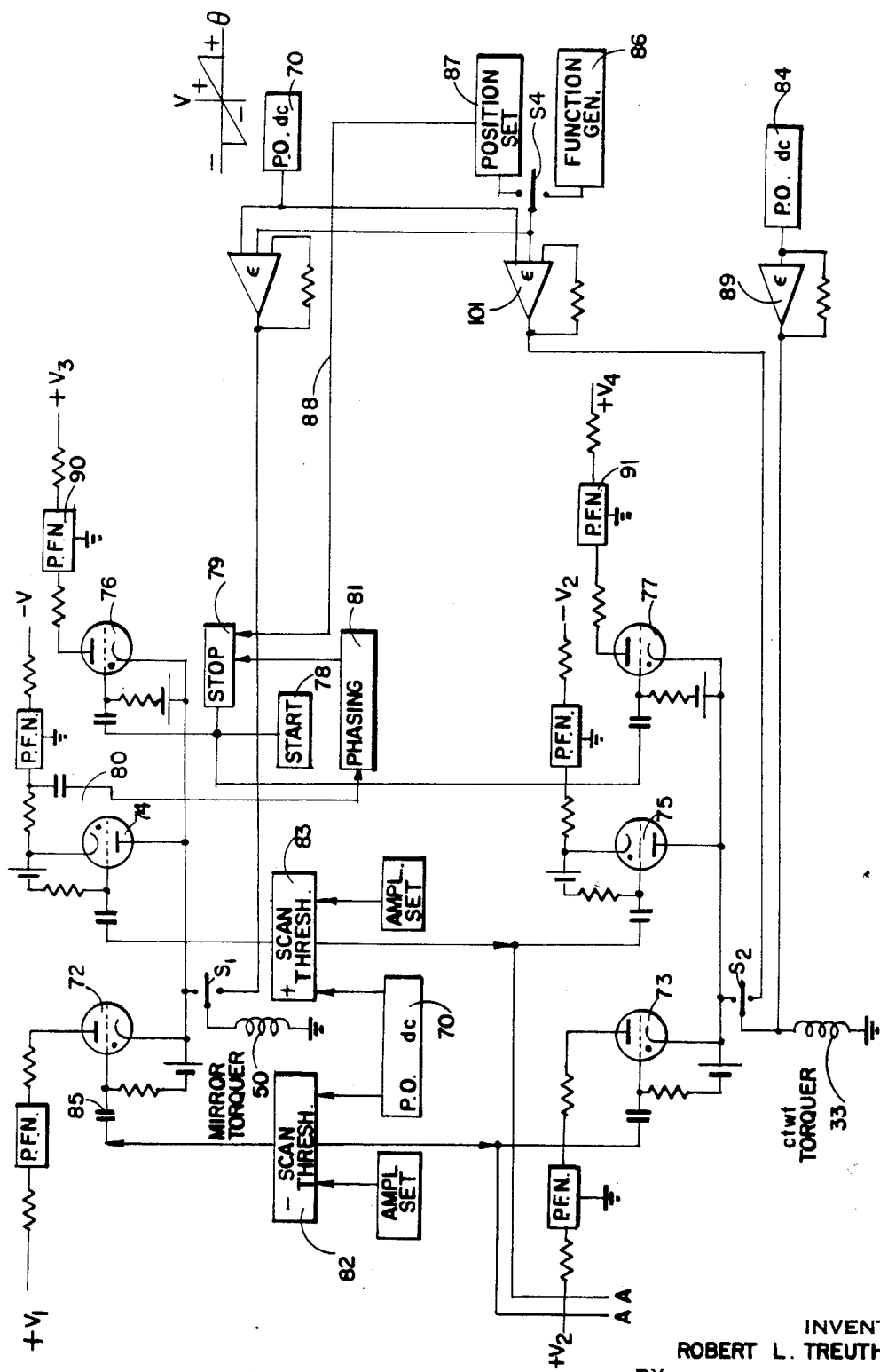
FIG. 6 is a circuit diagram of a scanner circuit which may be used in conjunction with the torquer coils to impart motion to the mirror.

Referring to FIG. 6, two torquer coils are shown — the mirror distributed torquer (all coils in series as one coil) 50, and the counterweight torquer (two counterweight coils in series as one) 33. While these could be operated in series by a very exacting design, it is far more practical to operate them with independent circuitry to allow each coil the proper current. The coils cannot receive current from a single supply resistor since that would allow a path for a counter-emf to pass current which, in turn, would damp the ballistic motion of the mirror. Hence two sets of circuitry are shown. Mirror torquer 50 and counterweight torquer 33 are excited ballistically by putting SPDT switches S1 and S2, respectively, in the upper positions. In the lower positions these switches allow servo mode operation and also manual positioning of the mirror via a handset potentiometer. Thyratron 72 operates from a positive supply $V_1$ to drive the mirror in one direction. Thyratron 73 drives the counterweight in the same direction. Thyratrons 74 and 75 are used to drive the mirror and counterweight in an opposite direction. Thyratrons 76 and 77 start and stop the ballistic scan. The impulse given the scanner to start or stop the motion is one-half that required to reverse the scan, since reversal at each end of the scan requires the mirror to be stopped and then accelerated in the opposite direction (hence a combined stop and a start impulse is delivered as a single reversing impulse). To start the scanner, the start button is operated and the start block 78 delivers a pulse to thyratron 76, discharging its pulse forming network 90 (PFN) through the coil 50. Also, thyratron 77 discharges its PFN 91 through coil 33. Thus each coil receives the proper impulse. The scanner is then driven toward the extreme of position (as previously set) and receives a reversing ballistic impulse. And so the scanner continues to operate as a ping pong ball between two paddles.

To stop the ballistic scan, the stop button on stop block 79 is actuated. This allows the next negative reversing impulse through 74 to be taken through a phasing circuit 81 and delivered through the stop block to thyratron 76 to dump its PFN 90. Thus, this PFN stores energy to either start the mirror or to stop it. At the same time, PFN 91 of tube 77 also stops the counterweight motion. In essence, when tube 74 fires to reverse the mirror, a negative pulse is available via capacitor 80. This pulse is slightly delayed in the phasing block 81 until the reverse impulse is well over and all energy is delivered to the torquer 50. Then, with the stop button on block 79 previously actuated, the stop block now passes the delayed signal from capacitor 80 so that tube 76 will fire and deliver a stop impulse of a polarity compatible with the direction of motion of the mirror. It would seem unnecessary to stop the scanner when going in the other direction, although this could be arranged. In a similar manner, tube 77 also dumps PFN 91 to stop the counterweight member via coil 33. Since we independently stop both the mirror and the counterweights, no bending moments are given the mirror and no vibration modes are generated. Once stopped, the scanner can be locked by putting S1 and S2 in the lower position. Then the scanner can be arranged to freeze position constantly or can crawl to a position set in by a potentiometer in the position set box 87. Actuation of S1 and S2, which are preferably electronic switches rather than mechanical switches can be achieved automatically, so that only the stop button need by actuated (or an electronic command given by computer, etc.) to initiate the stop and lock sequence, or the sequence of stopping and going to a home position.

Timing of ballistic impulses is achieved in the following manner. Since it is reasonable to desire the scanner to operate between predetermined CW and CCW limits of angle, reversal impulses are shown delivered when these limits of angle are reached. The CW scan threshold block 82 and CCW block 83 are provided with potentiometers set to the desired voltage level. Thus, if the pull scan CW from center is represented by a voltage +V from the position transducer or pickoff at the mirror, then the potentiometer can be set at any voltage up to value V. If set at 0.7 V, for example, then the mirror will reverse at 0.7 of its CW amplitude capability. Similarly, the CCW limit may be set (at 83) to, say −0.5V. Then the CCW reversal will occur at half displacement. The effective center of scan would then be +0.1V or 1/10 the CW capability of the mechanical center. Thus, the scan centroid and amplitude can be set as desired. When the pickoff voltage from the pickoff 70 rises to the value previously set into block 82, a signal will be given through capacitor 85 to fire thyratron 72 and reverse the CW scan. Similarly the CCW scan is reversed. The counterweight torques are also given reversal impulses from the same threshold or timing blocks 82 and 83.

In the servo mode of operation, with S1 and S2 in the lower position, the scanner angle may be made to follow the voltage waveform supplied by a function generator 86. This may be a sinusoid, a triangle, or a rectangular waveform, or some computer programmed waveform may be supplied. For example the scanner may at first be in a large amplitude ballistic search mode. When a target is observed, the scanner can stop within one scan resolution element and then operate in a computer commanded track mode — a servoed mode, where the scan angle is slaved to the voltage waveform given it. This servo follow mode is achieved with the switch S4 in the lower position. Here, the differential amplifier 101 operates on the differential voltage between the function generator (or computer output) and the position pickoff voltage. This differential is kept near zero by scanner motion. When switch S4 is in the upper position, the scanner moves to the home position set into block 87 and out of the ballistic mode. This same block can cause the scanner to freeze at any desired beam position by delaying the stop impulse (initiated at random during the scan) until the scanner reaches the preset position, via line 88. Of course, this freeze position can be computer delivered directly to the stop box 79 or to tube 76 (and 77) so that when in a search mode, a target sighting will instantly freeze the scan on target.

Since the mirror bearings are in the form of flexures to eliminate uncertain friction, the flexure torque is applied to the mirror and counterweight in proportion to the scanner displacement angle. The flexure torque can be kept low enough to be of no consequence, that is, to provide negligible distortion of the linear ballistic scan. However, if extra high linearity is desired, the flexure torque can be cancelled via a current in the counterweight torquer in proportion to the scanner displacement. Thus, the position pickoff voltage can be properly scaled via a constant gain amplifier 89 to give a counterweight coil current in proportion to the scanner angle (pickoff voltage, plus or minus). This is a high impedance source incapable of passing current due to the counter-emf of the torquer. Thus no damping will occur. For example, only a low current is required as can easily be supplied via the high impedance of a pentode type tube. Solid state equivalents can also be used. Thus, the flexure torque cancelling current can be permanently connected (no switching) if desired. Since the counterweight is directly mounted from the flexure, this torquer is ideal for flexure compensation. This current should not be applied to the mirror torquer. In order to control the rate of scan the ballistic impulse will be controlled. This is done by controlling the regulated current supply which the thyratrons, or SCRs, or power transistors gate to the torquers. The ballistic scan rate is thus directly proportional to the energy, or time-current product, of the impulse delivered to the torquer coils.

It will be seen that the scanner described above is a specific arrangement of a ballistic reciprocatable system wherein the driven mirror is pivoted to the support for reciprocating motion. The disclosed circuitry and electromagnetic torquing arrangement are ballistic driving means to alternately displace the mirror angularly in opposite directions about the pivot axis and between adjustable terminal positions of mirror displacement, at which positions mirror motion is reversed. The drive means applies ballistic forcing pulses to the mirror which pulses are illustrated in FIG. 9c and have a duration considerably less than the time required for the driven member to travel between its terminal, reversal positions. As shown by the flat portion of the velocity ($\dot{\theta}$) curve of FIG. 9b (the portion between positive and negative going "run" pulses of FIG. 9c), velocity of the mirror is constant for a major portion of its travel between terminal positions, and, during this constant velocity travel, the mirror is free of externally applied driving force.

In a typical resonantly driven mirror, on the other hand, the drive is continuous throughout scan, being a sinusoidal force applied by torsion of the pivot. Of course, to start and maintain the resonant oscillation, an additional driving force is applied, but the resonant mirror is driven primarily by the varying torsional force of its pivot and, accordingly does not have a constant velocity during any useful portion of its travel.

It will be understood that the elevation mirror when used can be operated ballistically also in like manner as the azimuth mirror if such operation is warranted. Or it can be operated in the servo mode. However, to provide a rectangular scan raster, what we will call an azimuth mirror would be operated with a ballistic scan and the elevation mirror would then serve to step the scan line to a new scan line of the raster pattern. Thus, we will discuss the stepping mode of operation. Both mirrors are of identical construction, and scan and step functions are interchangeable. (Even for the step mode, a distributed torquer is required to prevent vibration modes from appearing in the mirror).

The step impulse is delivered simultaneously with the scan reversal impulse on the other mirror. At each end of the scan the step is in the same direction and hence is always of the same polarity. However, at the end of the raster pattern a retrace to the beginning of the raster is desired. This is achieved by a different step impulse — which is merely a ballistic start impulse like that given to start the other mirror. Upon changing elevation angle to the beginning of the raster, the elevation mirror will be given a ballistic stop impulse. Then for the duration of this frame of the raster the elevation mirror will merely exhibit a step motion at beginning and end of the scan. Clearly, the raster is scanned each way, so that the forward scan and the retrace or reverse scan are equally useful. That is, the scan retrace cannot be faster than the fastest forward scan, so we will simply make both scan directions of equal rate and equal usefulness.

Figure 7:
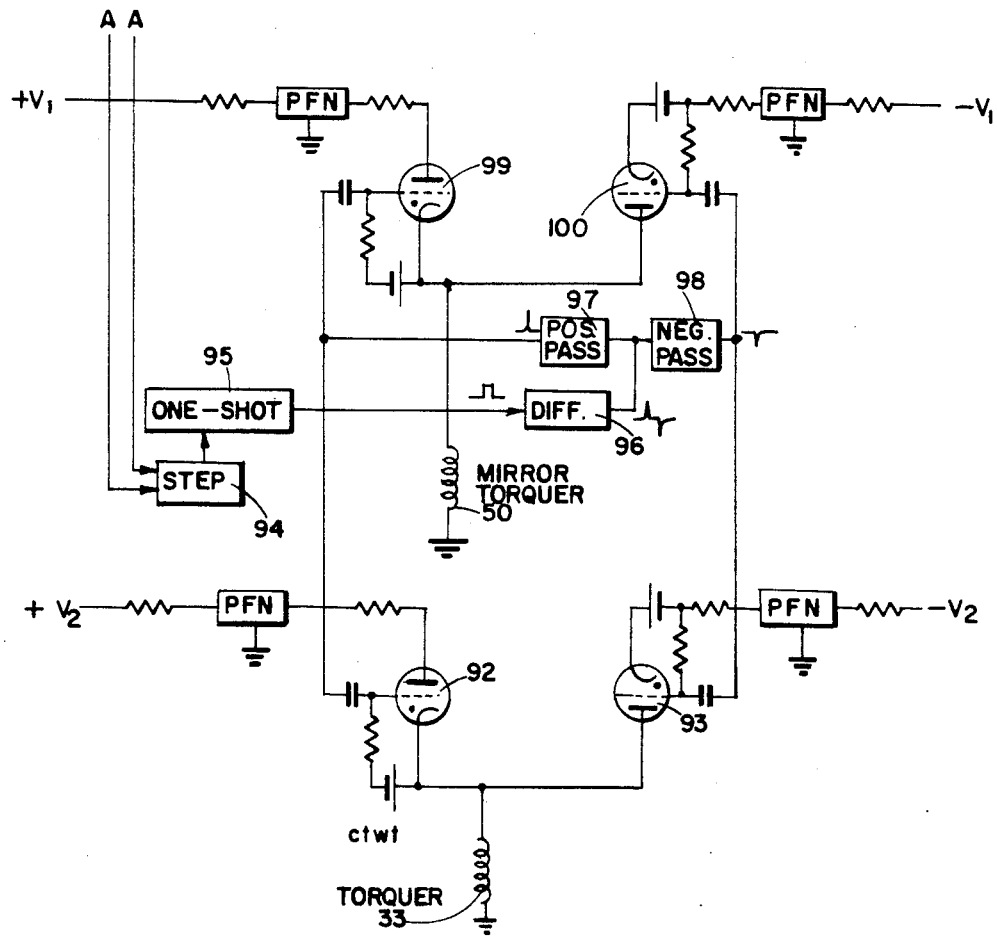
FIG. 7 is a circuit diagram of a scanner circuit which may be used to impart a stepping motion to a second mirror to form a raster pattern when used with the scanning mirror circuit of FIG. 6.

In FIG. 7, thyratrons 92, 93, 99 and 100 control the current impulses to the mirror and counterweight torquers, respectively. The circuit shown is used to step the mirror rather than to scan. The step impulse must accelerate the elevation mirror briefly and then decelerate it to a stop. Thus, a forward impulse is immediately followed by an impulse of reverse polarity. The two impulses constitute a "doublet pulse." For example, tube 99 will give a plus impulse and immediately tube 100 will give an equal negative impulse.

Returning to FIG. 6, briefly, we observe that reversal signals from blocks 82 and 83 are made available on lines AA. How in FIG. 7, inputs AA go to a "step" box 94 that signals a one-shot multivibrator 95. The duration of the pulse will depend upon the duration of the scan reversal impulse.

The block 95 output will be differentiated by block 96 so that the leading edge of the block 95 pulse will give rise to a sharp positive pulse at block 97 to fire tube 99 (and 92). This will be followed by a negative pulse at block 98 as derived from the trailing edge of the block 95 pulse. Thus, 97 passes only the positive spike and 98 passes only the negative spike from 96. The negative pulse from 98 will fire tube 100 (and 93) to decelerate the elevation mirror. Hence a quick, short duration elevation step motion is produced. The energy content in the PFNs will determine the speed of the step. Thus proper timing of the doublet and proper energy content of the doublet pulse delivered to the mirror and counterweight torquers 50 and 33 are both important.

FIGS. 8a through 8e illustrate various configurations utilizing two scanning mirrors to achieve a raster type scan. In FIGS. 8a and 8b, the mirrors are shown from a side and from an end position, respectively, with their pivot axis perpendicular to each other. FIGS. 8c and 8d illustrate the mirrors positioned in a two folded plane of operation; the pivot axis of each mirror being perpendicular to each other. FIG. 8e shows a mirror arrangement with one plane of folding.

Referring now to FIGS. 9a through 9c which illustrate the angular position $\theta$, the velocity $\dot{\theta}$ and acceleration $\ddot{\theta}$, which is proportional to current I through the torquers and the torque value T for the scanning mirror. Between useful scan intervals (FIG. 9a) there are short time intervals in which the mirror scan is reversed and during which time the stepping mirror can be indexed to the next line of a raster scan.

A return to the beginning of the raster pattern can be accomplished during the time of one scan line; where the second mirror is given a single scan simultaneously with a scan of the first mirror effecting a diagonal retrace. For the scan function as shown in FIG. 9c, alternate and equal pulses are of opposite polarity to cause reversal of motion at each end of the scan line. One-half height pulses are employed for startup and shutdown of the scan operations.

FIGS. 9d to 9f illustrate the angular position of the stepping mirror, the velocity of the mirror $\dot{\theta}$, and the torque applied to the mirror. In FIG. 9d the angular position $\theta$ is stepped in increasing amounts until the end of line scan is reached. The mirror is then retracted back to the starting angle.

FIG. 10a shows a standard raster pattern in which a target Y is intercepted. When the target is intercepted, the large raster can be switched to a small raster to increase the frequency of target crossings. The smaller raster is shown in FIG. 10b. As an alternate to the smaller scan, the interlaced scan of FIG. 10c may be used.

In FIG. 10d, the standard search scan can be connected to a circular scan when the target is located by applied sinusoidal voltages to each of the mirror torquing means with the voltages for separate mirrors phased 90° apart.

Figure 11:
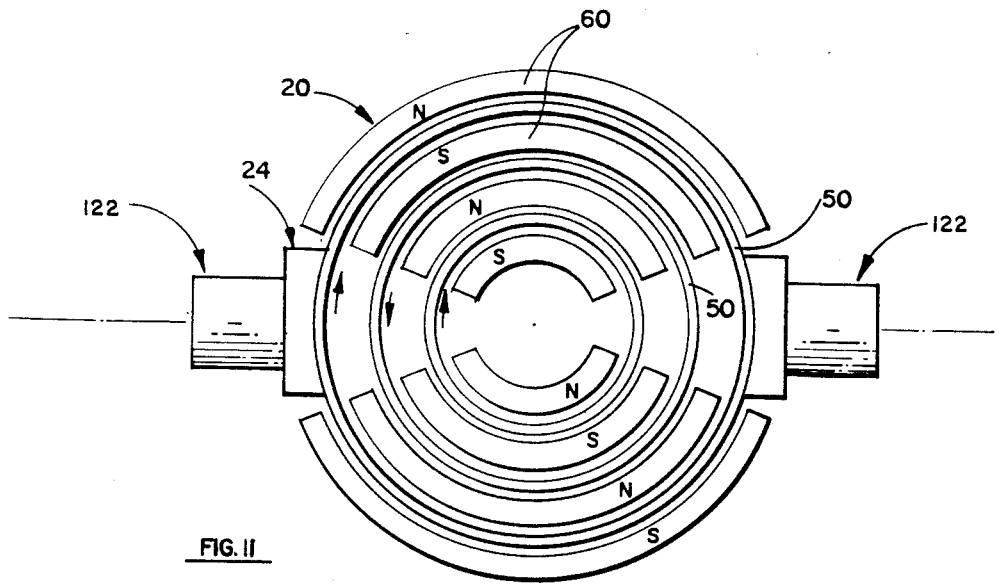
FIG. 11 illustrates an alternate torquer arrangement which may be used with a circular rather than a rectangular scanner mirror.

FIG. 11 illustrates a second embodiment of the scanning mirror element 20. In this embodiment the mirror is circular and is supported by means of air bearings 70 in the housing (not shown for clarity). The torquing magnets 60 are circular and segmented in shape with the torquing coils 50 being full circulars. The torquing magnets 60 are mounted directly to the housing just as they were in the embodiment of FIGS. 1, 2 and 3. Counterweights 24 are affixed to the mirror element, similar to the preceding embodiments.

Figure 12:
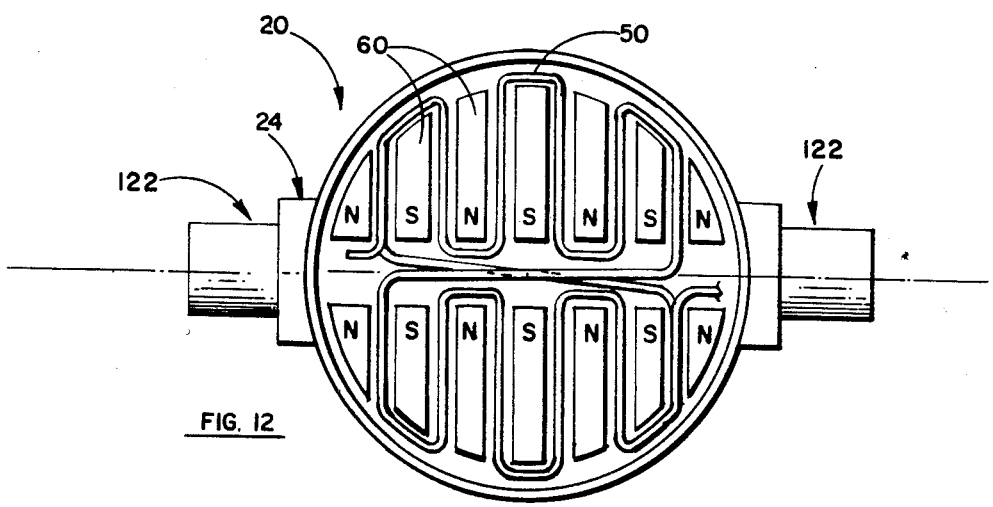
FIG. 12 illustrates another torquer arrangement which may be used with a circular rather than a rectangular scanner mirror.

In FIG. 12 a third embodiment of the scanning mirror element 20 is shown. In this embodiment, the permanent magnets 60 are positioned symmetrically perpendicular to the pivot axis of the mirror. The coil 50 is wound through the magnets so as to create a push-pull torque about the pivot axis when a current is passed through the coil.

While there has been shown what is considered to be the preferred embodiments of the present invention, it will be manifest that many changes and modifications may be made therein without departing from the essential spirit of the invention. It is intended, therefore, in the annexed claims to cover all such changes and modifications as fall within the true scope of the invention.

I claim:

1. A scanning mirror comprising in combination:
a mirror having a reflective surface;
support means for pivotly supporting said mirror about a pivot axis;
torquer means distributed over the rear of said mirror symmetrically with respect to said axis; and circuit means for energizing said torquer means on opposite sides of said pivot axis so as to simultaneously apply mutually aiding torques to said mirror on opposite sides of said axis.

2. The scanning mirror according to claim 1 wherein said torquer means are distributed to provide a distribution of moments of force about said pivot axis so as to minimize bending moments in said mirror.

3. The scanning mirror according to claim 1 and further comprising:
counterweights extending perpendicular to the mirror surface to statically and dynamically balance the weight of said torquer means on the rear of said mirror.

4. The scanning mirror according to claim 3 and further comprising:
counterweight torquer means connected between said counterweights and said support means for applying a torque to said counterweights to minimize the bending moments transmitted to said mirror.

5. A scanning mirror comprising in combination:
a mirror having a reflective surface;
a support means for pivotly supporting said mirror about a pivot axis;
a plurality of parallel rows of torquer means positioned on either side of and parallel with the pivot axis of said mirror; and
circuit means for activating said torquer means in a push-pull manner on opposite sides of said pivot axis to impart motions to said mirror.

6. The scanner mirror according to claim 5 wherein said plurality of parallel rows of torquer means are each angled with respect to the surface of said mirror such that each torquer exerts a force normal to radii extending from the pivot axis.

7. The scanning mirror according to claim 5 wherein each torquing means is comprised of:
a coil affixed to the rear of said mirror;
a permanent magnet affixed to said support means; and
a current source for supplying current to said coil.

8. The scanning mirror according to claim 5 wherein said circuit means is comprised of:
means for periodically providing pulses of one polarity to said torquer means to impart a ballistic motion in one direction to said mirror; and
means for periodically providing pulses of an opposite polarity to said torquer means to impart a ballistic motion in an opposite direction to said mirror, so as to cause said scanning mirror to scan a desired area.

9. The scanning mirror according to claim 5 wherein said circuit means is comprised of:
a pickoff connected between said mirror and said support means for providing a signal indicative of the position of said mirror with respect to said support means;
signal generating means for generating a position signal proportional to the desired positioning of said mirror;
comparing means providing a difference signal indicative of the difference between the pickoff signal and the position signal; and
means receiving said difference signal and providing a current to said torquing means so as to minimize said difference signal.

10. The scanning mirror according to claim 5 and further comprising:
counterweights extending perpendicular to the mirror surface to statically and dynamically balance the weight of said torquer means on the rear of said mirror.

11. The scanning mirror according to claim 10 and further comprising:
counterweight torquer means connected between said counterweights and said support means for applying a torque to said counterweights to minimize the bending moments transmitted to said mirror.

12. A ballistic reciprocatable system comprising
a support,
a driven member mounted to the support for reciprocating motion relative to the support, and
drive means for ballistically driving said driven member to alternately displace the member in opposite directions relative to the support between first and second terminal positions, whereby the driven member will repetitively travel with a reciprocating motion between said terminal positions, said drive means comprising means for applying to said driven member a ballistic forcing pulse having a duration considerably less than the time required for the driven member to travel from one of said terminal positions to the other whereby said member is driven by said drive means for only a small portion of its travel and travels free of externally applied driving force for a major portion of its travel between said terminal positions.

13. The ballistic system of claim 12 including means for applying said forcing pulse to said member at each of said terminal positions and in a sense and magnitude sufficient to reverse the direction of motion of said member and ballistically drive it to the other of said terminal positions.

14. The ballistic system of claim 13 including position pickoff means for sensing attainment of at least one of said terminal positions by said member, and means responsive to said pickoff means for initiating said ballistic forcing pulses.

15. The ballistic system of claim 14 wherein said means for initiating said ballistic forcing pulses comprises means for generating an electrical signal representing amplitude of the displacement of said member relative to said support, means for comparing said electrical signal with the output of said pickoff means, and means responsive to said comparing means for generating said ballistic forcing pulses.

16. The ballistic system of claim 14 including means for selectively adjusting the energy content of each of said ballistic forcing pulses to selectively adjust the frequency of reciprocation of said member between said terminal positions.

17. The ballistic system of claim 13 wherein said driven member comprises a mirror mounted to said support for periodic reciprocating pivotal motion about a pivotal axis, wherein said drive means comprises torque means on opposite sides of said pivot axis for simultaneously applying said forcing pulses as mutually aiding torque pulses to said mirror, said torque pulses each having a duration considerably less than the period of pivotal reciprocation of the mirror and each being applied to achieve reversal of the mirror at one of said terminal positions and to ballistically drive the mirror in reverse direction to the other of said terminal positions.

18. The apparatus of claim 17 including a second mirror pivotably mounted about a second pivot axis that is angulated with respect to said first mentioned pivot axis, second torque means for incrementally displacing said second mirror about the second axis, and means responsive to reversal of direction of the first mirror for operating said second torque means of the second mirror.

19. The system of claim 17 wherein said torque means comprises a plurality of substantially flat coils carried by said mirror on opposite sides of said pivot axis, said coils being mutually spaced from each other in a direction substantially normal to said pivot axis, a plurality of magnets carried by said support and providing a plurality of gaps, each said gap receiving a respective one of said coils.

20. The apparatus of claim 19 including a counterweight fixed to said mirror, and means for torqueing the counterweight in synchronism with the torque pulses applied to the mirror by said torque means.

21. The system of claim 19 including servo means for driving said mirror, and switch means for alternatively coupling said mirror to said servo means or to said first mentioned drive means.

22. A ballistic optical scanner comprising
a support,
a mirror having a reflective surface and being pivoted to the support about an axis lying in the plane of the reflective surface,
a first group of torquer coils fixed to the mirror and mutually spaced from each other in a direction substantially normal to said axis, said first group of torquer coils being fixed to the mirror on one side of said axis, a second group of torquer coils fixed to the mirror on the other side of said axis and being mutually spaced from each other in a direction substantially normal to said axis,
a magnetic structure carried by said support and having a plurality of magnetic gaps, each gap receiving a respective one of said torquer coils, and
means for energizing said first and second groups of torquer coils so as to apply mutually aiding torques to said mirror on opposite sides of said axis.

23. The scanner of claim 22 wherein each of said torquer coils lies in a plane that is substantially normal to a radius extending through said pivot axis, whereby a torque imparted to the mirror about said axis will be exerted at a distance from the axis and in a direction substantially normal to a radius extending through the axis.

24. The scanner of claim 22 wherein said means for energizing said torquer coils comprises clockwise and counterclockwise ballistic pulsing circuits, each said circuit comprising
a pulse generator,
a threshold device having an output to said pulse generator and having a first and second inputs,
a pickoff for sensing a first terminal position of said mirror at the end of one direction of its motion and having an output connected to a first input of said threshold device, and
an amplitude controller having a selectively variable output connected to the second input of said threshold device.

25. The apparatus of claim 24 including servo means for generating a mirror positioning signal and switch means for alternatively coupling the torquer coils to said servo means or to said pulse generator whereby the mirror may be ballistically reciprocated or servo controlled.

26. The apparatus of claim 25 including a counterweight connected to the mirror, clockwise and counterclockwise counterweight pulsing circuits, and means for torqueing said counterweight in response to said counterweight pulsing circuits or said servo means.

* * * * *